H. BONNEVIE.
ELECTRICAL FLAME ARC FURNACE FOR OXIDIZING THE NITROGEN OF THE AIR.
APPLICATION FILED NOV. 30, 1914.
1,173,699.
Patented Feb. 29, 1916.
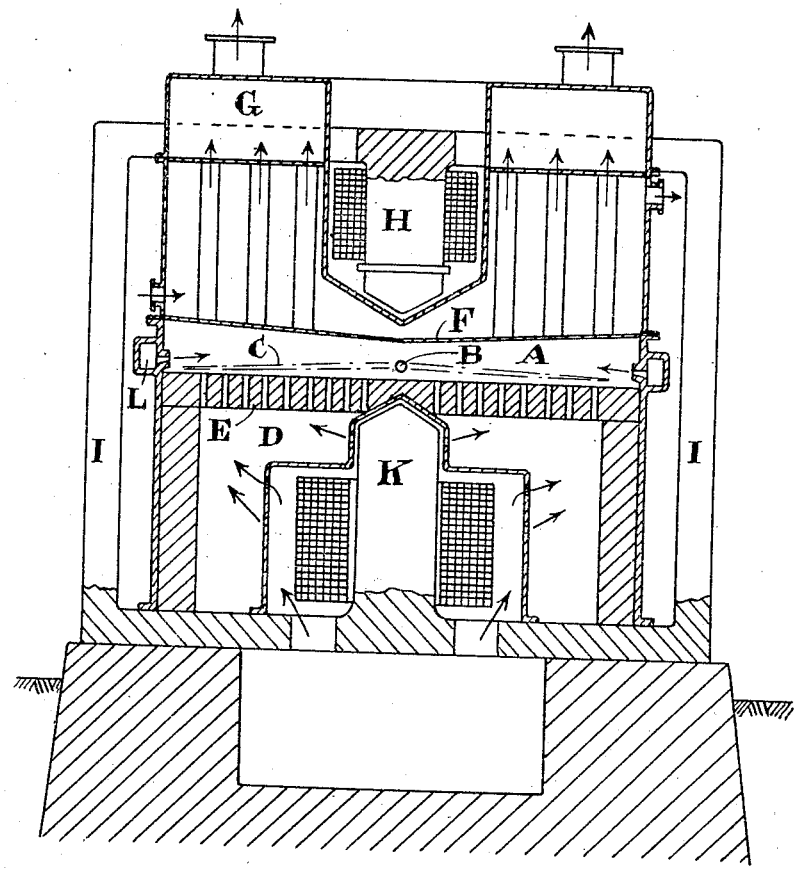

UNITED STATES PATENT OFFICE.

HARALD BONNEVIE, OF RJUKAN, NORWAY, ASSIGNOR TO NORSK HYDRO-ELEKTRISK KVÆLSTOFAKTIESELSKAB, OF CHRISTIANIA, NORWAY.

ELECTRICAL FLAME-ARC FURNACE FOR OXIDIZING THE NITROGEN OF THE AIR.

1,173,699.   Specification of Letters Patent.   Patented Feb. 29, 1916.

Application filed November 30, 1914. Serial No. 874,900.

*To all whom it may concern:*

Be it known that I, HARALD BONNEVIE, a subject of the King of Norway, residing at Rjukan, Norway, have invented certain new and useful Improvements in Electrical Flame-Arc Furnaces for Oxidizing the Nitrogen of the Air; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention has for its object an electrical arc furnace for oxidizing the nitrogen of the air and simultaneously cooling the resulting gases and utilizing the heat of same.

In the ordinary Birkeland furnace the air passes through the furnace in the direction of the arc *i. e.* it passes through the plane of the flame arc or disk. This arrangement is not quite an ideal one in as much as it is difficult to realize a rapid refrigeration in direct connection with a furnace of this form.

According to a modified form of the same furnace the air is blown sidewise through the flame, the magnetic field being to this effect of such non-symmetrical arrangement that the flame, by the air, will assume the shape of an umbrella. Subsequent experiments made with furnaces of this type have shown that it is possible to so arrange the magnetic field and the air supply that a steam boiler (with fire tubes) or another metallic receptacle for a cooling fluid may be disposed without any risk of perforation on the other side of the flame arc or disk in such close proximity to the latter that a very efficient cooling can be realized almost immediately after the air has passed through the arc flame, and as in this form the air will not encounter the arc more than once, the entire process will under this way proceed in ideal conditions.

In accordance herewith the present invention consists in the combination with a Birkeland flame arc furnace having its air supply through a perforated wall on one side of the flame, of a steam boiler or other efficient cooling metal wall disposed on the other side of the flame disk in close proximity to same. Beside preventing the dissociation of the resulting nitrous gases, this arrangement also realizes the best possible utilization of the heat of the gases; the cooling fluid behind the cooling furnace wall may consist of water which is heated and utilized either as feed water for the steam boiler or converted directly into steam in a receptacle placed behind the cooling wall. The cooling fluid may also suitably consist of various descriptions of products resulting from the further manufacture, and which are to be evaporated preheated or subjected to a particularly strong heating. The cooling fluid may consist furthermore of vapor air or gases so as to have in direct connection with the flame chamber of the furnace a steam superheater or a calorifère with temperature of up to 1200° C. Said receptacle for the heating of the fluid or gases is traversed by the gas-outlet tubes from the flame chamber of the furnace, whereby one is enabled to utilize a greater or less amount of the heat of the furnace in direct connection with the latter by mounting a greater or less number of outlet tubes with a greater or less cooling area. By a suitable distribution of the outlet tubes and of the cooling area the best possible distribution, with a view to the oxidizing process in the furance, is also realized of the gas or air mixture in and above the flame field.

By putting the flame chamber of the furnace, as stated, in direct communication with said liquid, vapor, or gas cooler one is also enabled to reduce the temperature of the gases in this cooler from that of the flame chamber *i. e.* 1100°–1200° C. down to 800°–900° C. and to subsequently utilize the heat of the gases in a separate steam boiler. One form of such a furnace is shown in the accompanying drawing in section.

The drawing shows a furnace with horizontal flame disk but the furnace may also be arranged in accordance with the common type with vertical flame disk.

A is the furnace chamber, B the electrodes and C the flame arc.

D is an air supply chamber disposed below the furnace chamber and though the perforated wall E of which the air is blown straight into the flame arc. The furnace chamber is confined above by the underside of a fire tube boiler F. The gases pass through the fire tubes of the latter up into an annular box G connected with exit tubes for the gases. In practice one will of course arrange the cooling device in such a way as to allow of independent repairs on the latter or on the furnace for instance by mounting the boiler on separate pillars.

H, K are the magnets which are connected by an iron frame I and the upper one of which is of less strength than the other so as to allow of giving to the flame the necessary vaulted shape. In order to secure the best possible adjustment the magnets or the magnet coils should allow of independent regulation.

In order to improve the refrigeration of the gases coming from the flame zone by means of the cooling wall on the back side of the flame one may use a current of cooling air or gases to be introduced radially to the plane of the flame arc from the circumference of the flame chamber along the back face of the flame disk and with a slight backward turn in the direction of the gas current. Experiments made with the Birkeland Eyde flame arcs have shown, in fact, that the same have their maximum amount of energy in their central and outer zones, and this leads to the presumption that here too the reaction of the gases will be most intense. By introducing an air or gas current directly over this zone one will be enabled to increase in a very efficient way, above the most critical range of the flame field, the cooling effect required to impede the dissociation. On the drawing the inlet duct for this cooling air is marked L.

It is remarked, moreover, that the air supply openings should be so distributed in E that the amount of air supplied in any point will correspond approximately to the amount of energy which the arc is capable of rendering at that point; the fire tubes of the boiler may be distributed accordingly.

Claims.

1. In an electric furnace, an extended narrow furnace chamber, a cooler forming one wall of said chamber, means to produce a magnetically dispersed arc in said chamber and means to direct reacting gas through said narrow chamber and arc to said cooler.

2. In an electric furnace, a horizontal narrow extended furnace chamber, a fire tube boiler forming the upper wall of said chamber, means to produce a dispersed arc within said chamber, a portion of said means surrounded by said boiler, and means to supply reacting gases through the bottom wall of said chamber for passage through said arc to said boiler.

3. In an electric furnace, means to produce a dispersed arc, means to direct reaction gases through the arc, and means to direct cooling gas along the rear surface of said arc for mixture with the reaction gases as soon as they emerge from said arc.

4. In an electric furnace, a narrow furnace chamber, a fire tube boiler forming one wall of said chamber, means to produce a magnetically dispersed arc in said chamber, means to pass reaction gases through said arc to said boiler, and means to supply cooling air between said arc and boiler.

5. In an electric furnace, a narrow furnace chamber, a fire tube boiler forming the upper wall of said chamber, means in said chamber to produce an arc, magnets to disperse said arc into umbrella form, means to direct radial currents of air over the convex surface of the arc, and means to supply reaction gases through the bottom wall of said furnace, one of said magnets being surrounded by said boiler.

6. In an electric furnace, an electromagnet, an air chamber surrounding the same, said air chamber having a perforated wall between said magnet and a narrow furnace chamber, a cooling body forming a wall of said furnace chamber opposite said perforated wall and through which gaseous products of the furnace pass, and an electromagnet of less strength than the aforementioned magnet within the body.

In testimony that I claim the foregoing as my invention, I have signed my name in presence of two subscribing witnesses.

HARALD BONNEVIE.

Witnesses:
M. E. GUTTORMSEN,
C. F. HANSEN.

Copies of this patent may be obtained for five cents each, by addressing the "Commissioner of Patents, Washington, D. C."